4 Sheets--Sheet 1.

O. P. DRAKE.
Improvement in Apparatus for making Gas.

No. 9,967. Patented Aug. 30, 1853.

4 Sheets--Sheet 2.

O. P. DRAKE.
Improvement in Apparatus for making Gas.

No. 9,967. Patented Aug. 30, 1853.

4 Sheets--Sheet 3.

O. P. DRAKE.
Improvement in Apparatus for making Gas.

No. 9,967.  Patented Aug. 30, 1853.

4 Sheets--Sheet 4.

O. P. DRAKE.
Improvement in Apparatus for making Gas.

No. 9,967. Patented Aug. 30, 1853.

UNITED STATES PATENT OFFICE.

OLIVER P. DRAKE, OF BOSTON, MASSACHUSETTS.

BENZOL-VAPOR APPARATUS.

Specification forming part of Letters Patent No. 9,967, dated August 30, 1853; Reissued November 15, 1864, No. 1,819.

*To all whom it may concern:*

Be it known that I, OLIVER P. DRAKE, of Boston, in the county of Suffolk and State of Massachusetts, have invented a new or improved apparatus for vaporizing benzol or other suitable volatile hydrocarbon and mixing it with atmospheric air, so that the mixture may be burned for the purposes of illumination or otherwise; and I do hereby declare that the same is fully described and represented in the following specification and the accompanying drawings, letters, figures, and references thereof.

Figure 1:
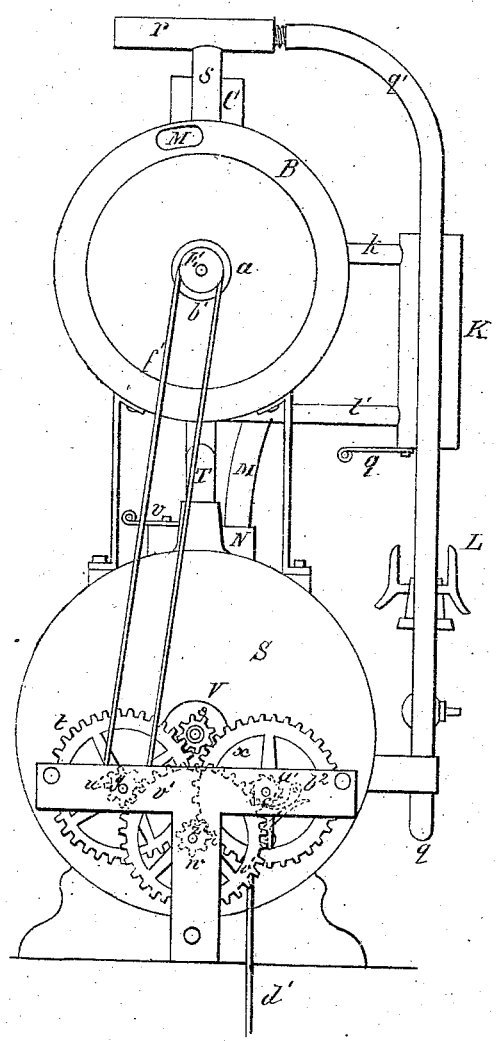
Figure 2:
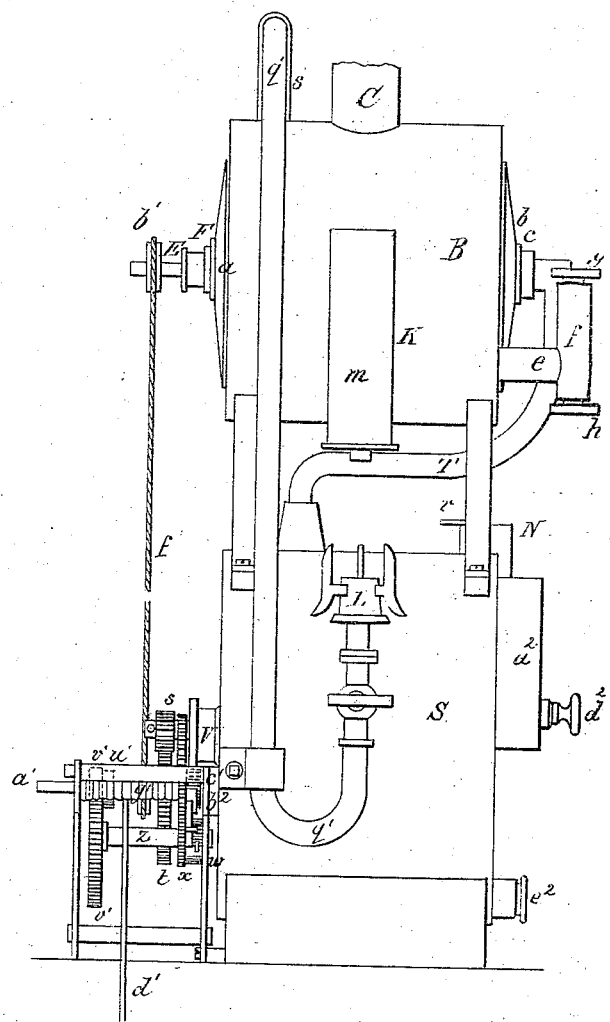
Figure 3:
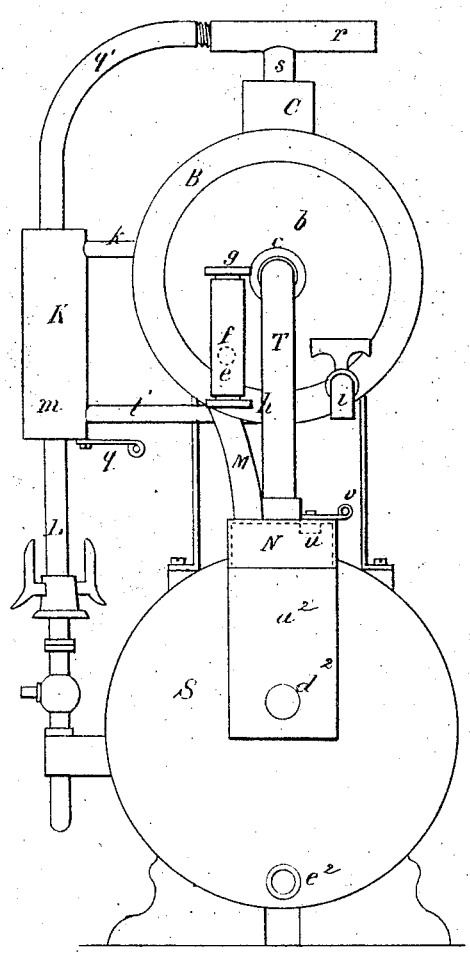
Figure 4:
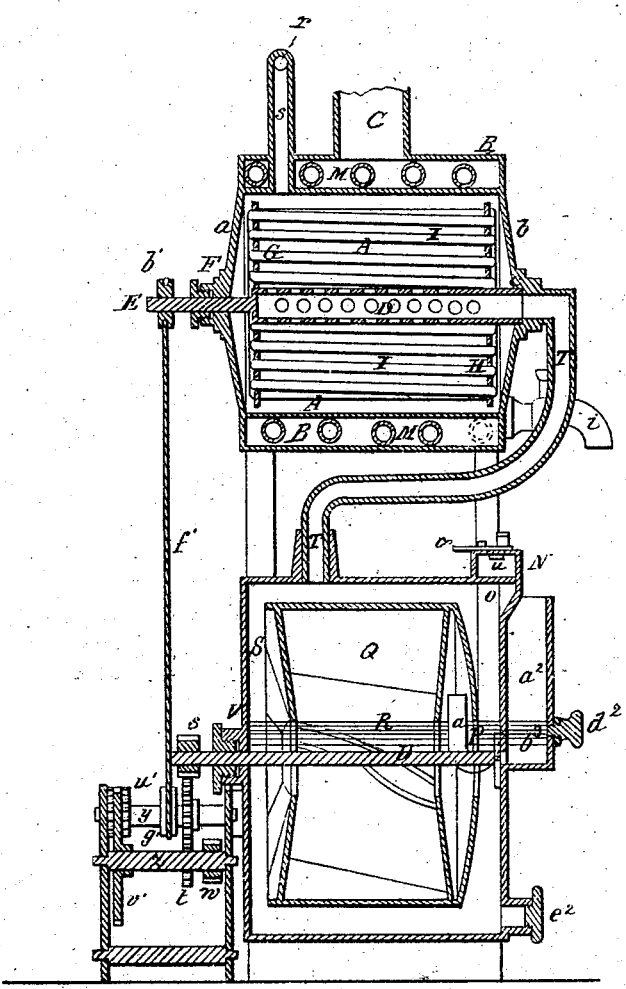
Figure 5:
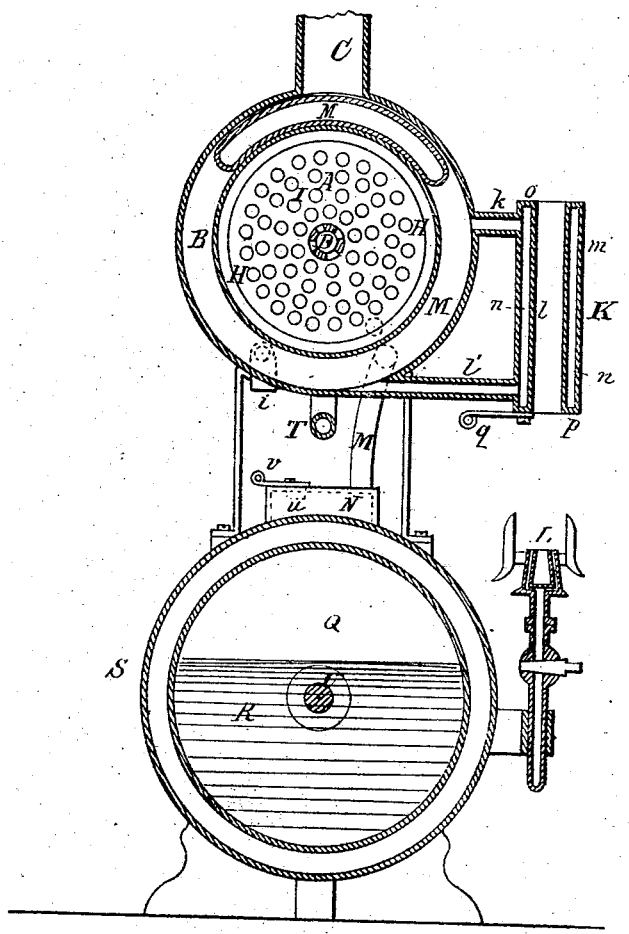

Of the said drawings, Figure 1, denotes a front elevation of my said apparatus. Fig. 2, is a side elevation of it. Fig. 3, is a rear elevation of it. Fig. 4, is a vertical and longitudinal section of it. Fig. 5, is a transverse and vertical section of it taken through the water heater and gas burner to be hereinafter described.

In the same A, represents a closed cylindrical or other proper shaped water tight vaporizing chamber or generator, which is surrounded by or placed concentrically within a water vessel or cistern, B, that is to be filled wholly or partially with water or a liquid so that the same may rest against the external surface of the said vaporizing chamber, there being an opening or pipe C, in or at the top of the vessel B, for the purpose of enabling it to be supplied with water whenever necessary, such water being poured into such opening or pipe.

Extending centrally through the chamber A, is a hollow shaft D, which terminates at its front end in, or is connected to a solid shaft E, that passes through and turns in a water tight stuffing box F, attached to the head, $a$, of the vaporizing chamber, and has a small grooved pulley, $b'$, fixed on it. The opposite or rear end of the shaft is made open and to revolve in a suitable bearing, $c$, applied to the head, $b$, of the chamber A.

Figure 6:
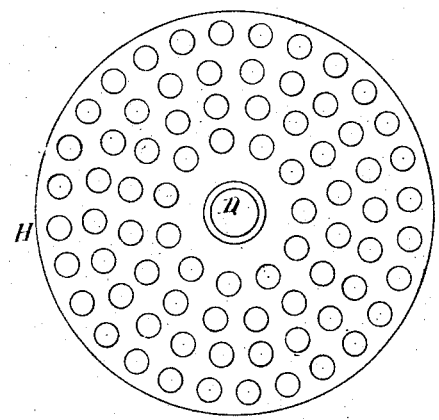

Two circular disks or metallic plates G, H, are fixed on the shaft and near to its extremities and within the vaporizing chamber, the shaft being to pass centrally through them. Each one of these disks is perforated with numerous holes, which, may be arranged in concentric circles as seen in Fig. 6, which denotes a side view of one of the plates. These holes are calculated to receive and support cotton wicking or other suitable fibrous rope or absorbent material, which is to be made to extend from disk to disk by being laced or run through the holes thereof.

Figure 7:
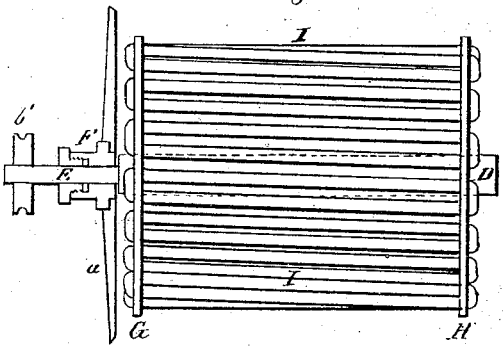

Fig. 7, is a side view of the shaft, disks, and lacing of fibrous material, which together I term the vaporizer I.

The hollow shaft of the vaporizer should be perforated with numerous holes so that when the air is blown into the open end of the shaft, it may be made to pass laterally out of the perforations and to impinge against the surrounding strands of wicking or fibrous, material. A short tube, $e$, extends horizontally out of the lower part of the rear end of the vaporizing chamber A, and opens into a vertical tube $f$, whose top is arranged at the maximum height to which the benzolic liquid in the vaporizing chamber is to stand.

Screw caps, $g$, $h$, are respectively adapted to the upper and lower ends of the tube $f$. By removing the lowest cap from the tube, we are enabled to draw any liquid out of the vaporizing chamber. The hot water vessel B, also, has a cock, $i$, adapted to its lower part, by which it may be emptied of water, whenever such may be desirable or necessary. Connected with the water vessel B, by means of two tubes $k$, $l'$, is a heater K, the tubes being made to respectively open into the upper and lower parts of it. The heater consists of a cylindrical water tight vessel composed of two tubes $l$, $m$, placed concentrically, the one within the other, and so that there shall be a water space, $n$, between them, which water space is closed by annuli $o$, $p$, at top and bottom. The inner tube, $l$, of the heater is thus left open at both ends, so that smoke or heat from the flame of a gas burner L, may pass up through it. The lower end of the heater is provided with a small closing door or turning valve, $q$, which is to be so adapted to the same, as to enable a person to close the end of the tube, $l$, to any desirable extent, in order to diminish the current of heat passing through it.

The gas burner L, made in the ordinary way is connected with the vaporizing chamber A, by a tube $q'$. It is intended that the gas-burner and heater shall be placed in any convenient situation. The tube $q'$, communicates with the vaporizing chamber A, by being connected with one end of a short horizontal tube, $r$, that is made to communicate with the vaporizing chamber by a vertical tube, $s$. A pipe for transmitting the mixture of air and benzolic vapor to other burners may be connected with the opposite end of the tube, $r$.

An induction air pipe M, opens out of one end of the water vessel B, and is coiled within said vessel and around the vaporizing chamber A, and finally passes out of the bottom of the vessel B, and enters the top of a small chamber N. In the top of this chamber N, there is a hole or opening $u$, which is provided with a closing slide $v$, so adapted to it as to enable a person either to cover the opening or uncover it to any desirable extent. Out of the bottom of the chamber N, a pipe O, is led downward and into the opening P, of one end of a meter wheel Q. From thence it is extended upward above the surface of the water, R, in which the said meter wheel is partially immersed. This meter wheel is made in all respects substantially like that of a gas meter of the kind termed the "wet meter" and it revolves within a closed case S. As it is a well known contrivance and as I would avoid unnecessary prolixity in the description of my apparatus, I do not deem it necessary to enter into a further explanation of its construction. It is made to revolve in the water of the case, S, and to receive air from the pipe, O, at one end and discharge it into the space of the case S, which is above the water. From out of this space a pipe T is led and made to open into or communicate with the open end of the hollow shaft D.

The axle U, of the meter wheel extends through and works in a stuffing box V, applied to the side of the case S, and has a pinion gear $s$, fixed on it. The pinion $s$, engages with a train of gears and pinions, $t$, $u'$, $v'$, $w$, $x$, which are arranged and situated on three shafts, $y$, $z$, $a'$. The latter gear $x$, turns freely on the shaft, $a'$, and has a spring pawl, $b^2$, fitted to one end of it, and made to engage with a ratchet wheel, $c'$, fixed on the shaft, $a'$. A cord, $d'$, has one end affixed to the shaft, $a'$, the other end having a weight connected to it. By applying a key or crank to one end of the shaft, $a'$, and turning it so that the ratchet wheel, shall slip on the spring pawl $b^2$, the cord may be wound on the shaft, $a'$, so as to elevate the weight. The descent of the weight will set in motion the train of gears so as to communicate a rotary motion to the meter wheel, Q. The meter wheel is thus made to force air into the hollow shaft, D, which rushing out of its perforations and against the benzol liquid taken up by the vaporizer I, will cause the liquid to be evaporated and be mixed with it, the warmth of the air serving to facilitate the process of evaporation.

Should the air become too much heated so as to produce an undue evaporation of the benzol, an indication of which will be the production of an undue quantity of smoke from the flame of the burner, the small slide $v$, of the opening, $u$, may be moved so as to uncover the opening to the extent sufficient to allow a proper quantity of cool air to pass into the pipe O, of the meter wheel and mix with descending currents of hot air. This, as a matter of course, will modify or lessen the heat of the air passing into the vaporizer.

Should the water in the vessel B, become too hot, by turning the slide of the heater, so as to interrupt the passage of the heat of the flame of the burner up through the heater we can diminish or regulate the heat thereof. The vaporizer is revolved by means of an endless band $f$, made to pass around the grooved pulley $b'$, and another grooved pulley $g'$, the latter being fixed on the shaft $y$. The common "wet meter" for gas as ordinarily constructed and used has its wheel turned by the pressure of the gas. It is not rotated by a power applied on the outside of the meter and to the shaft of the wheel as is the case in my apparatus.

The meter wheel, its case and the fluid contained therein are employed in my apparatus for an entirely different purpose and are made to operate in an entirely different manner from what they are when used to measure the amount of gas consumed or made to flow through the meter wheel. The application of the meter wheel, its closed case, and the liquid thereof, for the purpose of forcing air, or as an air blast apparatus is new to the best of my knowledge and belief. In my apparatus, the meter wheel receives air instead of gas through the pipe, O, and being put in revolution, its chambers are alternately filled with air and water so as to force air into the space of the case that is above the surface of the water.

While the velocity of revolution of the meter wheel remains constant, the equal measures of air are delivered into the vaporizing chamber and of course to the burner or burners in equal times. The resistance of the water to the wheel while the latter is in revolution, forms an excellent power to counteract the gravitating tendency of the weight suspended from the cord of the axle $a'$, and cause such weight to fall with a regular velocity. Therefore to increase the velocity of revolution of the meter wheel, it will be necessary to increase the weight on said cord.

On the back of the case, S, there is a small chamber $a^2$, it being made open at top and to extend down to about the middle of the end of the case. This chamber communicates with the interior of the case, S, by an orifice, $b^3$. The object of the chamber is to enable a person to supply the case S, with water, which may be poured into the open top of the chamber, and will run from the chamber into the case. A small screw plug $d^2$, is inserted in the orifice made in the side of the chamber $a^2$, at the height at which the water is to stand in the case, S. By removing the plug, the water from the case, S, will run out of its orifice until it reaches the level of the bottom thereof. An orifice and screw plug as seen at, $e^2$, is arranged at the lower part of the case S, for the purpose of enabling it to be freed from water whenever necessary.

An apparatus made in the above mentioned manner will not only be found very efficient in the production of benzol vapor mixed with air, but will produce such a regular pressure and flow of such aeriform mixture through its gas burner or burners as will cause an unsurpassed steadiness in the height of the flame. Besides the luminosity of the flame is far greater than that of the coal gas.

I claim as my invention.

1. The combination of the heater, K, and gas burner L, with the water vessel B, and vaporizing chamber, A, substantially as specified, so that by means of the said heater and gas burner and the pipes connecting them with the water vessel B, and the chamber, A, the whole or a part of the mixture of air and benzol vapor produced by the apparatus may not only be used in any convenient place for the purpose of illumination, but also for heating the water of the vessel B, as specified.

2. I am aware that for the purposes of evaporating saccharine fluids, a hollow shaft surrounded by plates and having perforations, has been made to revolve over an open cistern (containing the saccharine liquor) while air has been blown into such shaft, and made to pass against the plates partially immersed in the liquid and put in revolution. I therefore do not claim such, but what I do claim as my invention and for the purpose of vaporizing benzol or other suitable volatile hydrocarbon and mixing it with air, is the combination of the closed vaporizing chamber, A, the rotary vaporizer or disseminator I, (placed therein) and the rotary meter, wheel Q, and its closed case S, or an air forcing apparatus as made to force a stream of air into the hollow shaft of the vaporizer and through or against saturated portions of the disseminator and into the vaporizing chamber or regenerator so as to vaporize the benzol or hydrocarbon and mix it with air substantially as above specified.

3. And in combination with the rotating meter wheel and its case, and the hot water vessel B, I claim the coiled induction air pipe M, as made to pass through the water in the vessel, B, and thereby receive heat therefrom so as to warm the air as it passes through the pipe and to supply oxygen to the volatilized vapors, and for the purpose of facilitating the evaporation of the same.

4. And in combination with the induction air pipe M, I claim the chamber N, and its regulator slide and orifice applied for the purpose of supplying cold air to the warmed air or to the meter wheel in order to diminish or regulate the temperature of the air passing into the said wheel and forced into the vaporizing chamber.

5. I also claim the peculiar mode of making the rotary disseminator or vaporizer (I) viz., of two perforated heads or disks, or hollow perforated shaft, and strands of lamp wicking or other absorbent material stretched from one head to the other as specified.

6. And for the purpose of an air blast apparatus, I claim the application and use of the meter wheel, its closed case and liquid therein substantially in the manner as above specified, not meaning to claim the method of using the meter for the admeasurement of gas, and wherein, the wheel of the meter is turned by the gas itself, but meaning to claim it, as having its wheel operated by a separate power and applied in conjunction with the water and closed case and induction and eduction pipes for the purpose of blowing air as specified.

In testimony whereof, I have hereto set my signature this fourteenth day of April A. D. 1853.

OLIVER P. DRAKE.

Witnesses:
R. H. EDDY,
F. P. HALE, Jr.

[FIRST PRINTED 1913.]